United States Patent [19]
Youngblood, Jr.

[11] 3,741,274
[45] June 26, 1973

[54] AWNING MOUNTING STRUCTURE

[76] Inventor: Hugh A. Youngblood, Jr., 3225 N. Virginia, Oklahoma City, Okla. 73118

[22] Filed: Jan. 28, 1971

[21] Appl. No.: 110,393

[52] U.S. Cl.............. 160/23 R, 135/1 A, 135/5 A
[51] Int. Cl............................................. E04f 10/06
[58] Field of Search..................... 160/23, 26, 319, 160/66, 67; 135/1 A, 5 A; 296/1 S, 91; 224/42.1 R, 42.1 E

[56] References Cited
UNITED STATES PATENTS

| | | | |
|---|---|---|---|
| 3,514,023 | 5/1970 | Russell et al. | 296/1 S |
| 3,364,973 | 1/1968 | Railson | 160/26 |
| 2,942,609 | 6/1960 | Ferguson | 135/1 A |
| 1,121,898 | 12/1914 | Davis | 160/319 |

*Primary Examiner*—Peter M. Caun
*Attorney*—Dunlap, Laney, Hessin & Dougherty

[57] ABSTRACT

A V-shaped housing which includes convergent top and bottom plates, and substantially parallel end plates, which end plates receive and journal opposite ends of a shaft upon which an awning is rolled. Keyed to the shaft inside the housing is a pulley having a rope wound thereabout for reeling the awning upon the shaft. The housing is supported on legs so that the bottom wall of the housing inclines downwardly when the housing is mounted on the roof of a camper vehicle or the like to cause air flowing beneath the bottom wall of the housing to be directed downwardly adjacent the rear of the vehicle. This partially alleviates the partial vacuum adjacent the rear of the camper vehicle during over-the-road operation at relatively high speed.

2 Claims, 3 Drawing Figures

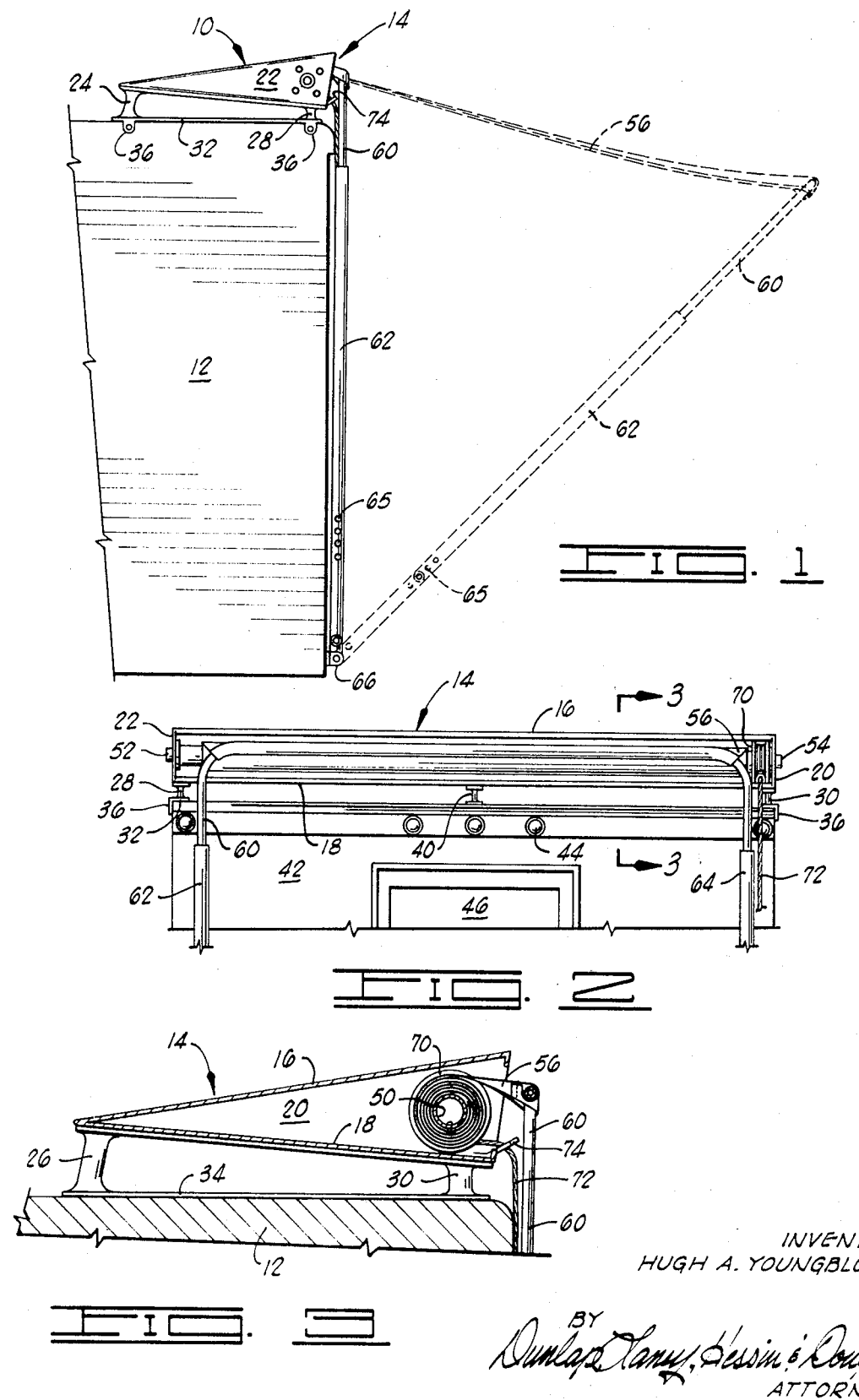

AWNING MOUNTING STRUCTURE

BACKGROUND OF THE INVENTION

1. Field of the Invention

This invention relates to a structure for mounting awnings on vehicles such as campers, trailers and the like. More particularly, the invention relates to structure for retractively mounting an awning on the upper rear portion of a camper vehicle so that the awning can be selectively extended to provide shade and shelter to the immediate rear of the camper, or can be retracted into a housing to be out of the way and in a protected position during travel of the camper.

2. Brief Description of the Prior Art

With the advent of small camping trailers, mobile homes and so-called truck-mounted campers, various designs of these vehicles and structures have been evolved which include awnings or flexible roof structures which can be extended and retracted as may be demanded by the status of the camper at any time, i.e., when used in over-the-road travel, or when used for a stationary living accommodation. Various types of supports for these awnings have been utilized. For example, U. S. Pat. No. 2,773,547 to Voss discloses a holder for supporting and mounting an awning, which holder is adapted to be mounted on the roof of a motor vehicle. Some consideration is here given to lowering the wind resistance offered by this type of awning holder. The holder, however, does not positively contribute to a reduction in the resistance to forward travel of the vehicle which results from the development of a reduced pressure immediately to the rear of the vehicle as it is moved over the highway at high speeds.

Apart from the consideration of various structures for mounting extensible awnings on vehicles, there has been a recognition of the desirability of providing structure for the deflection of air downwardly along the back of the vehicle as it is driven at high speeds. This induced air flow aids in preventing pressure reduction at this location to the point where a significant drag is imposed on the vehicle. A disclosure of this type is that appearing in Andrews U.S. Pat. No. 3,097,882.

BRIEF DESCRIPTION OF THE PRESENT INVENTION

The present invention provides structure for mounting an awning on a vehicle so that the awning may be quickly extended to provide a shade-producing overhang at the rear of the vehicle or, alternately, retracted into a housing where the awning is protected and stored in such way as to avoid interference with forward travel of the vehicle. The awning mounting structure has the further advantage of offering minimum resistance to forward travel of the vehicle and, further than this, of positively enhancing the ease with which the vehicle may be driven in a forward direction at relatively high speeds by alleviating pressure reduction immediately to the rear of the vehicle at such speeds.

Broadly described, the awning mounting structure of the present invention comprises a housing which includes a top wall, a bottom wall and a pair of substantially parallel end walls interconnecting the top and bottom walls. A shaft or roller is rotatably supported between the end walls of the housing adjacent an open side thereof, and has a flexible roof member, such as a tarp or awning, connected thereto for rolling up on the shaft. The shaft has a pulley or sheave keyed thereto, and a rope or other flexible pull member is secured to the sheave to facilitate winding up the flexible roof member on the shaft.

The housing has secured to the bottom wall thereof, a pair of relatively long legs, and a pair of relatively short legs. The legs are connected to a pair of supporting runners used to mount the housing on the roof of a camper vehicle. Each of the runners extends between one short leg and one long leg so that when the runners bear flatly against the substantially horizontal roof structure of a camper, the bottom wall of the housing of the awning mounting structure is directed downwardly and rearwardly and functions to direct air moving across the top of the camper downwardly along the back side of the camper.

In a preferred embodiment of the invention, the housing is of generally V-shaped configuration with the top and bottom walls thereof joining along one edge and diverging from each other toward the rear of the housing--that is, toward that portion of the housing to which the relatively short legs are secured. The described V-shaped configuration of the housing prevents the housing from offering substantial resistance to air flow over the top of the camper as the vehicle upon which the camper is mounted travels at relatively high speeds.

From the foregoing description of the invention, it will have become apparent that it is an important object of the invention to provide a compact, easily mounted awning supporting structure which can be quickly and easily mounted on a camper vehicle to permit a flexible roof member, such as a tarp or awning, to be extended rearwardly from the camper to provide shade and shelter over an area immediately to the rear of the camper.

An additional object of the invention is to provide an awning supporting structure which offers minimum resistance to air flow across the top of the camper, and thus affords minimum interference with the forward travel of the camper carrying vehicle.

An additional object of the present invention is to provide an awning supporting structure which can be quickly and easily mounted on a vehicle-carried camper, and which functions during such mounting to deflect air downwardly adjacent the back of the camper to lower resistance to forward travel of the camper at high speeds.

Additional objects and advantages of the invention will become apparent as the following detailed description of the invention is read in conjunction with the accompanying drawings which illustrate the invention.

BRIEF DESCRIPTION OF THE DRAWINGS

FIG. 1 is a side elevation view of an awning mounting structure constructed in accordance with the present invention, as such structure is mounted upon, and used in combination with, a camper vehicle.

FIG. 2 is a rear elevation view of a portion of the structure depicted in FIG. 1.

FIG. 3 is a sectional view taken along line 3—3 of FIG. 2.

DETAILED DESCRIPTION OF A PREFERRED EMBODIMENT OF THE INVENTION

The awning mounting structure 10 of the invention is depicted in FIG. 1 as secured to the roof of a camper 12 of the type which is mounted in the bed of a pickup truck. The mounting structure 10 includes a housing 14 which has top and bottom walls, 16 and 18, respectively, and a pair of end walls 20 and 22. The top and bottom walls 16 and 18, respectively, are joined along two longitudinal edges thereof, and diverge from each other in a V-shaped configuration. The top and bottom walls 16 and 18 are joined at opposite ends by the end walls 20 and 22 so that the housing 14 is open at one side which is opposite the side formed by the convergent, joined edges of the top and bottom walls.

Secured to the bottom wall 18 of the housing 14 are a plurality of supporting legs. The supporting legs include a pair of relatively long legs, 24 and 26, secured to the bottom wall 18 adjacent its edge joined to the top wall 16, and a pair of relatively short legs 28 and 30 which are secured to the bottom wall 18 adjacent its longitudinal edge which is opposite the longitudinal edge joined to the top wall 16. A pair of supporting or mounting runners 32 and 34 are secured to the lower ends of the supporting legs 24–30, with one runner 34 extending between, and secured to, a relatively short leg 30 and a relatively long leg 26, and another runner 32 extending between, and secured to, the lower ends of a relatively short leg 28 and a relatively long leg 24. In a preferred embodiment of the invention, the runners 32 and 34 carry bolt brackets 36 which facilitate the bolting of the runners to the camper 12.

It will be noted in referring to FIGS. 1 and 3 that when the housing 14 is mounted on the substantially horizontally extending roof of the camper 12 by the use of the supporting legs in the manner shown, the effect is to provide an air space between the bottom wall 18 of the housing 14 and the top wall of the camper 12, which space is of diminishing cross-sectional area as the space progresses toward the rear of the camper 12. Stated differently, the bottom wall 18 of the housing 14 is inclined downwardly and rearwardly with respect to the horizontal as a result of the difference in length of the supporting legs 28 and 30 as compared to the supporting legs 24 and 26. If desired, additional centrally located supporting legs corresponding in length to the relatively longer and relatively shorter supporting legs may be provided for supporting the center of the housing 14, one of such legs being shown in FIG. 2 and designated by reference numeral 40.

Also as shown in FIG. 2 and FIG. 1, the awning mounting structure 10 is positioned on the camper 12 at a location adjacent the rear of the camper and thus overhangs or projects beyond a rear wall 42 of the camper. In accordance with conventional camper construction, a series of brake and running lights 44 are provided at the upper side of the rear wall 42 of the camper adjacent its intersection with the roof. There is also provided in the rear wall 42, a door 46 which can be swung open to facilitate entry into the camper.

Disposed within the housing 14 of the mounting structure 10 is an elongated shaft or roller. In the illustrated embodiment of the invention, an elongated roller 50 is provided in the center of the housing 14 and carries at its opposite ends, stub shafts 52 and 54 which are journaled in the end walls 22 and 20, respectively. The roller 50 is thus rotatably mounted within the housing 14 and may be used to support a flexible roof member, such as a tarpaulin or awning. Thus, an awning 56 may have one of its ends secured to the periphery of the roller 50 so that it can be rolled up on the roller to a retracted position as best illustrated in FIG. 3. Alternately, the awning 56 may be pulled out to a rearwardly extending position as shown in dashed lines in FIG. 1.

The leading edge of the awning 56 has a hem formed therein so that the bight portion of a U-shaped supporting member 60 may be extended through this hem. The U-shaped supporting member 60 telescopes into a pair of sleeves 62 and 64 located at opposite sides of the camper vehicle 12. The sleeves 62 and 64 slidingly receive the U-shaped supporting member 60 and are provided with a plurality of pin holes 65 which facilitate insertion of a stop pin to adjust the position of the legs of the U-shaped supporting member 60 within the sleeves 62 and 64. The ends of the sleeves 62 and 64 opposite the open ends which receive the ends of the U-shaped supporting member 60 are pivotally connected to brackets secured to the camper 12 near the lower side of the rear wall 42, one of such brackets being depicted in FIG. 1 and designated by reference numeral 66. This pivotal mounting of the sleeves 62 and 64 permits the awning to be supported in the manner shown in dashed lines in FIG. 1 after the awning has been pulled out to unwind it from the roller 50. When the awning 56 is retracted and wound upon the roller 50 as depicted in FIGS. 1 and 3 in full lines, the sleeves 62 and 64 extend downwardly at opposite sides of the rear wall 42 of the camper 12 so that they do not interfere with the opening and closing of the door 46, and do not obscure the running lights 44.

Keyed to the shaft 54 at a location just inside the end wall 20 of the housing 14 is a sheave or pulley 70. Rotation of the pulley 70 causes rotation of the shaft 54 and of the roller 50. An elongated flexible member such as a cable or rope 72 has one of its ends secured to the pulley 70 and is wound upon the pulley in such a way that when the awning 56 is extended, the rope 72 is substantially fully wound upon the pulley 70 with only a short portion of the rope extending from the pulley and through a hole in an eye bracket 74. From this status, the rope 72 is then pulled outwardly to unwind it from the pulley 70 at such time as it is desired to retract the awning and wind it upon the roller 50.

In the use of the awning mounting structure 10 of the invention, the mounting structure is secured to the upper side or roof of a vehicle, such as a camper 12 shown in the drawings. Securement is obtained by the use of the brackets 36. The runners 32 and 34 are retained flat against the flat upper side of the roof of the camper and in this position of mounting, the housing 14 is positioned as shown in FIGS. 1 and 2. Thus, the bottom wall 18 is inclined downwardly and rearwardly from its forward edge where it is secured to the diverging top wall 16. The effect of this geometric orientation of the bottom wall 18 relative to the top of the camper is to provide a constriction in the path of air flow between the housing 14 and the camper 12 so that air is entrapped, and tends to be jetted downwardly adjacent the back side 42 of the camper 12. The direction of the air flow along the back side of the camper helps counteract a reduction in pressure which normally occurs as the camper is driven at high speeds along the highway. The pressure reduction along the back of the camper creates a drag which tends to reduce the forward speed of the vehicle, or at least to require greater power to maintain a desired speed.

The V-shaped configuration of the housing 14 in which the top wall 16 and bottom wall 18 are joined along their leading edges functions to reduce the resistance to air flow which is afforded by the housing. In other words, the streamlined or sharpened leading edge of the housing 14 offers little resistance to the flow of air which can be divided to flow across the opposite walls of the housing formed by the bottom wall 18 and top wall 16.

When the vehicle carrying the camper 12 is parked, and it is desired to use the camper, this can be accomplished by extending the awning 56 outwardly to form a roof or shading structure to the rear of the camper. Extension of the awning 56 is accomplished merely by pulling outwardly on the sleeves 62 and 64 to pivot them about their pivotal axes in the brackets 66. This results in the sleeves 62 and 64 being extended to the positions shown in dashed lines in FIG. 1. The U-shaped supporting member 60 may then be extended outwardly relative to the sleeves 62 and 64 until the awning 56 has been elevated at its outer end to the desired location. At this time, pins are slipped into the pin holes 65 in the sleeves 62 and 64 at the particular hole which is to be used to secure the U-shaped supporting member 60 in the proper orientation relative to the sleeves 62 and 64.

As the awning 56 is extended in the manner described, it is concurrently, of course, unrolled from the elongated roller 50. As the roller 50 rotates, the shafts 52 and 54 secured to the opposite ends thereof are also rotated. The pulley 70 is also rotated. With the rotation of the pulley 70 upon extension of the awning 56, the cable or rope 72 is wound up on the pulley so that the end portion of the cable or rope barely projects through the eye bracket 74. At a time when it is desired to retract the awning 56 and wind it upon the roller 50, the end of the rope 72 is pulled to cause the pulley 70 to rotate, which in turn rotates the shaft 54 which is attached to the roller 50. In this way, as the rope 72 is pulled outwardly, the awning 56 is wound up on the roller 50. When the awning 56 is completely retracted, the sleeves 62 and 64 are adjacent the rear wall 42 of the camper 12 as shown in FIG 1. The rope 72, which is at this time extended, may be stored in any convenient location, such as within the housing 14.

From the foregoing description of the invention, it will be perceived that the present invention provides an easily mounted, inexpensively constructed and mechanically durable awning mounting structure for use in mounting an extensible awning on a camper or other vehicle. The structure is reliable in operation because it is simple in its construction and depends upon manual operation for retraction of the awning, rather than spring loading of the awning roller or other automatic retraction device which might be more susceptible to malfunction than the manual retraction afforded by the rope 72 and the pulley 70.

Although a preferred embodiment of the invention has been herein described in order to clearly explain the principles of operation involved to those having skill in the art, it is to be understood that various changes and innovations in the described embodiment can be effected without departure from the basic principles of the invention. Changes and innovations of this type are therefore deemed to be circumscribed by the spirit and scope of the present invention, except as the same may be necessarily limited by the appended claims or reasonable equivalents thereof.

What is claimed is:

1. An awning mounting structure comprising:
   a housing including:
     a top wall;
     a bottom wall; and
     a pair of spaced end walls interconnecting the top and bottom walls of the housing;
   a first pair of horizontally spaced legs secured to said bottom wall adjacent the side edge of said housing;
   a second pair of horizontally spaced legs which are of relatively shorter length than the legs of said first pair of legs secured to said bottom wall adjacent the open side of said housing;
   a first runner secured to the free outer end of one of the legs in said first pair of legs, and to the free outer end of one of the legs in said second pair of legs;
   a second runner horizontally spaced from said first runner and secured to the free outer end of one of the legs in said first pair of legs and to the free outer end of one of the legs in said second pair of legs;
   means rotatably mounted in said housing and extending substantially parallel to the open side thereof for supporting an awning wound thereupon about the rotational axis of said rotatably mounted means;
   means for selectively rotating said rotatably mounted means to retract said awning into said housing;
   an awning releasably wound upon said rotatably mounted means and positioned for extension through the open side of said housing; and
   awning supporting means having one portion secured to an end of said awning for supporting said awning in a position extending substantially horizontally from said housing.

2. An awning mounting structure comprising:
   a housing of V-shaped sectional configuration including:
     a top wall;
     a bottom wall secured to said top wall along side edges of said top and bottom walls to form a side edge of said housing; and
     a pair of spaced end walls interconnecting the top and bottom walls of the housing, said housing being opened at one side thereof, said top and bottom walls diverging from each other in a direction away from said side edge;
   a first pair of horizontally spaced legs secured to said bottom wall adjacent the side edge of said housing;
   a second pair of horizontally spaced legs which are of relatively shorter length than the legs of said first pair of legs secured to said bottom wall adjacent the open side of said housing;
   a first runner secured to the free outer end of one of the legs in said first pair of legs, and to the free outer end of one of the legs in said second pair of legs;
   a second runner horizontally spaced from said first runner and secured to the free outer end of one of the legs in said first pair of legs, and to the free outer end of one of the legs in said second pair of legs;
   a roller for supporting an awning wound thereupon about the rotational axis of said roller;
   an awning releasably wound upon said roller and positioned for extension through the open side of said housing;
   shafts secured to the opposite ends of said roller and rotatably journaled in the end walls of said housing;
a pulley secured to said shaft for coaxial rotation therewith about a common axis;
an elongated flexible member secured to said pulley and windable thereon as said awning is unwound from said roller; and awning supporting means having one portion secured to an end of said awning for supporting said awning in a position extending substantially horizontally from said housing.

* * * * *